United States Patent
Choi

(10) Patent No.: US 11,434,959 B2
(45) Date of Patent: Sep. 6, 2022

(54) PROPELLER SHAFT FOR VEHICLE

(71) Applicants: Hyundai Motor Company, Seoul (KR); Kia Motors Corporation, Seoul (KR)

(72) Inventor: Hyung Chul Choi, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 15 days.

(21) Appl. No.: 17/028,515

(22) Filed: Sep. 22, 2020

(65) Prior Publication Data

US 2021/0332859 A1 Oct. 28, 2021

(30) Foreign Application Priority Data

Apr. 22, 2020 (KR) .................. 10-2020-0048387

(51) Int. Cl.
*F16D 9/08* (2006.01)
*F16D 1/116* (2006.01)
*F16D 1/06* (2006.01)
*F16D 1/10* (2006.01)

(52) U.S. Cl.
CPC .............. *F16D 9/08* (2013.01); *F16D 1/06* (2013.01); *F16D 1/116* (2013.01); *F16D 2001/103* (2013.01); *Y10T 403/11* (2015.01); *Y10T 403/7033* (2015.01); *Y10T 403/7035* (2015.01)

(58) Field of Classification Search
CPC . F16C 3/023; F16D 1/06; F16D 1/108; F16D 1/112; F16D 1/116; F16D 9/06; F16D 9/08; F16D 2001/103; Y10T 403/11; Y10T 403/7033; Y10T 403/7035

USPC ............... 403/2, 359.5, 359.6; 464/32
See application file for complete search history.

(56) References Cited

U.S. PATENT DOCUMENTS

| | | | | |
|---|---|---|---|---|
| 2,964,931 A * | 12/1960 | Sorenson | ........... | F16D 9/06 464/32 |
| 4,543,074 A * | 9/1985 | Ville | ........... | F16D 9/06 403/2 |
| 6,059,085 A * | 5/2000 | Farnsworth | ........... | F16D 9/08 464/32 |
| 7,591,356 B2 * | 9/2009 | Guyader | ........... | F16D 9/08 192/55.1 |
| 8,047,919 B2 * | 11/2011 | Arden | ........... | F16D 9/06 464/32 |
| 9,303,695 B2 * | 4/2016 | Choi | ........... | F16D 9/06 |
| 9,863,481 B2 * | 1/2018 | Yun | ........... | F16C 3/023 |
| 10,240,641 B2 * | 3/2019 | Akita | ........... | F16C 3/023 |
| 10,247,245 B2 * | 4/2019 | Uhrick | ........... | F16D 1/076 |

(Continued)

FOREIGN PATENT DOCUMENTS

| | | |
|---|---|---|
| JP | 2001354194 A | 12/2001 |
| KR | 2015-0096759 A | 8/2015 |
| KR | 101610586 B1 | 4/2016 |

*Primary Examiner* — Josh Skroupa
(74) *Attorney, Agent, or Firm* — Fox Rothschild LLP

(57) ABSTRACT

A propeller shaft for a vehicle in which a tube yoke is connected to a main tube via an adapter and tapered splines are formed at the contact regions between a tube yoke and the main tube to transmit the power output from a transmission to a rear wheel. The tube yoke and the main tube are displaced relative to each other at the tapered splines to break the adapter. The tube yoke and the main tube are thus separated from each other by virtue of the breakage of the adapter.

13 Claims, 11 Drawing Sheets

(56) References Cited

U.S. PATENT DOCUMENTS

| | | |
|---|---|---|
| 10,584,640 B2* | 3/2020 | Rodriguez ................ F16D 9/08 |
| 10,598,015 B2* | 3/2020 | Oren ........................ F16D 1/116 |
| 2018/0231060 A1* | 8/2018 | Milanesio ................ F16D 1/06 |
| 2019/0048800 A1* | 2/2019 | Patil .......................... F16D 9/08 |
| 2020/0040946 A1 | 2/2020 | Akita et al. |

* cited by examiner

PROPELLER SHAFT FOR VEHICLE

CROSS-REFERENCE TO RELATED APPLICATION

This application claims under 35 U.S.C. § 119(a) the benefit of priority to Korean Patent Application No. 10-2020-0048387 filed on Apr. 22, 2020, the entire contents of which are incorporated herein by reference.

BACKGROUND

(a) Technical Field

The present disclosure relates to a propeller shaft for a vehicle, and more particularly, to a propeller shaft for a vehicle in which a tube yoke and a main tube are connected to each other via an adapter while being in contact with each other through face splines thereof to improve performance for absorbing impact energy.

(b) Background Art

The recent trend is to extensively develop high-performance vehicles having excellent traveling ability. Most of such high-performance vehicles adopt rear-wheel drive to improve handling and operation performance. For a rear-wheel drive system, a propeller shaft for transmitting power from a transmission to a rear-wheel drive shaft is inevitably required, and, in addition to the rear-wheel drive or high-performance vehicles, a propeller shaft for transmitting power to a rear wheel is also used in a vehicle in which four-wheel drive is optionally applied to a fundamentally front-wheel-drive system for stable traveling on rough roads.

Since the propeller shaft is subjected to strong rotational force and torsion during power transmission, the propeller shaft must be made of a material capable of enduring the strong rotational force and torsion. Particularly, since the propeller shaft extends in the longitudinal direction of a vehicle body, the propeller shaft must be configured to absorb impact energy while the length thereof is shortened to reduce injury of a passenger in the event of a collision of the vehicle.

An assembly structure and a structure for absorbing impact of a conventional propeller shaft will now be described. FIG. 1 of the accompanying drawings illustrates a conventional propeller shaft for a vehicle according to the prior art. As illustrated in FIG. 1, the conventional propeller shaft 10 includes a tube yoke 11 connected to an output side of a transmission, a front main tube 12 connected to a rear portion of the tube yoke 11, a rear main tube 14 connected to an input side of a differential gear unit for distributing power to a rear-wheel drive shaft, and a constant-velocity joint (CVJ) 13 disposed between the front main tube 12 and the rear main tube 14 and connected thereto.

For reference, the constant-velocity joint is applied to ensure the power-transmission function of the propeller shaft and to increase the support stiffness of an intermediate portion of the propeller shaft when the length of the vehicle is increased. The propeller shaft 10 may be greatly deformed, and may thus cause breakage of peripheral components or injury of passengers, due to impact energy applied in the longitudinal direction of the vehicle in the event of a collision of the vehicle. Accordingly, the propeller shaft 10 has a structure capable of absorbing impact energy in the event of a collision.

As illustrated in FIG. 1, the front main tube 12, for example, has a front small-diameter portion 12-1 and a rear large-diameter portion 12-2 that are integrally connected to each other. Consequently, when the impact energy caused by a collision is transmitted to the front main tube 12, it is possible to absorb the impact energy while the small-diameter portion 12-1 is pushed into the large-diameter portion 12-2.

Furthermore, when the impact energy caused by a collision is transmitted to the front main tube 12, it is possible to absorb the impact energy while the connecting portion between the small-diameter portion 12-1 and the large-diameter portion 12-2 is bent. However, when the front main tube 12 includes the small-diameter portion 12-1 and the large-diameter portion 12-2, strength required for power transmission, which is the main function of the front main tube 12, decreases due to the decrease in the outside diameter of the small-diameter portion 12-1.

Although it is possible to prevent the decrease in strength required for power transmission by increasing the overall diameter of the front main tube 12 including the small-diameter portion 12-1 and the large-diameter portion 12-2, disadvantageous layout and excessively increased weight are caused, and thus the front main tube 12 is not efficiently subjected to compressive deformation.

In addition, since the impact energy caused by a vehicle collision is not correctly transmitted in the longitudinal direction of the front main tube 12 even when the front main tube 12 includes the small-diameter portion 12-1 and the large-diameter portion 12-2, the small-diameter portion 12-1 may not be substantially pushed into the large-diameter portion 12-2, and the front main tube 12 may strike the floor of the vehicle body while being bent, thereby increasing damage to the vehicle and injury to passengers in the vehicle.

Furthermore, since the connecting portion between the tube yoke 11 and the front main tube 12, that is, the connecting portion between the rear end of the tube yoke 11 and the front end of the small-diameter portion 12-1 of the front main tube 12, is integrally formed through friction welding (F), as illustrated in FIG. 1, the tube yoke 11 and the front main tube 12 are not absolutely separated from each other by the impact energy caused by the collision of the vehicle, and thus, the connecting portion between the tube yoke 11 and the front main tube 12 absorbs the impact energy is not obtained.

Additionally, a structure for absorbing impact energy is also applied to the constant-velocity joint 13. For example, it is possible to absorb impact energy by forming a partition wall (not shown) in the constant-velocity joint 13, which is capable of being collapsed by the impact energy caused by a vehicle collision. However, since only the partition wall in the constant-velocity joint 14 is collapsed by the impact energy caused by the collision of the vehicle, and separation and a deformation amount of individual components of the constant-velocity joint are restricted, an effect of absorbing the impact energy becomes less effective.

The above information disclosed in this section is merely for enhancement of understanding of the background of the disclosure and therefore it may contain information that does not form the prior art that is already known in this country to a person of ordinary skill in the art.

SUMMARY

The present disclosure provides a propeller shaft for a vehicle, in which a tube yoke may be connected to a main tube via an adapter and tapered splines may be formed at the contact regions between a tube yoke and the main tube to more easily transmit the power output from a transmission to a rear wheel, and in which the tube yoke and the main tube may be displaced relative to each other at the tapered splines to break the adapter, with the result that the tube yoke and the main tube may be separated from each other by virtue of the breakage of the adapter to efficiently absorb impact energy.

In one aspect, the present disclosure provides a propeller shaft for a vehicle that may include an adapter, which is coupled at a front end thereof to an inner surface of a tube yoke and at a rear end thereof to an inner surface of a main tube and which has a breakage-inducing notch formed at a predetermined location between the front end and the rear end of the adapter, first tapered splines, which are formed at a rear end of the tube yoke, and second tapered splines, which are formed at a front end of the main tube and are alternately engaged with the first tapered splines to transmit power. In particular, breakage occurs at the breakage-inducing notch due to the striking force that is generated when the first tapered splines of the tube yoke are displaced relative to the second tapered splines of the main tube by the impact energy caused by a vehicle collision.

In an exemplary embodiment, the inner surface of the tube yoke may include a female threaded portion, and the front end of the adapter may include a male threaded portion to be threadedly engaged with the female threaded portion of the tube yoke. In addition, the inner surface of the main tube may include a locking groove, and the rear end of the adapter may include a plurality of elastic clips to be coupled to the locking groove. Each of rear ends of the plurality of elastic clips may be integrally formed with a hook, which is bent outwards to be fitted into the locking groove.

The propeller shaft may further include an O-ring, which is fitted into the breakage-inducing notch in the adapter to block infiltration of foreign substances. The rear surfaces of the first tapered splines and the front surfaces of the second tapered splines may have tapered surfaces, which are in oblique surface contact with each other.

In particular, the first tapered splines may include a plurality of first teeth and a plurality of first tooth grooves, which are circumferentially and alternately arranged, and a rear surface of each of the plurality of first teeth and the plurality of first tooth grooves may be formed into a first tapered surface, which is inclined outwards from the inner surface to an outer surface of the tube yoke. The second tapered splines may include a plurality of second teeth and a plurality of second tooth grooves, which are circumferentially and alternately arranged, and a front surface of each of the plurality of second teeth and the plurality of second tooth grooves may be formed into a second tapered surface, which is inclined inwards from an outer surface to the inner surface of the main tube.

In another exemplary embodiment, the first tapered splines may include a plurality of first teeth and a plurality of first tooth grooves, which are circumferentially and alternately arranged, and a rear surface of each of the plurality of first teeth and the plurality of first tooth grooves may be formed into a first tapered surface, which is inclined inwards from an outer surface of the tube yoke to the inner surface thereof. The second tapered splines may include a plurality of second teeth and a plurality of second tooth grooves, which are circumferentially and alternately arranged, and a front surface of each of the plurality of second teeth and the plurality of second tooth grooves may be formed into a second tapered surface, which is inclined outwards from the inner surface to the outer surface of the main tube.

BRIEF DESCRIPTION OF THE DRAWINGS

The above and other features of the present disclosure will now be described in detail with reference to certain exemplary embodiments thereof, illustrated in the accompanying drawings which are given hereinbelow by way of illustration only, and thus are not limitative of the present disclosure, and wherein.

Figure 1:
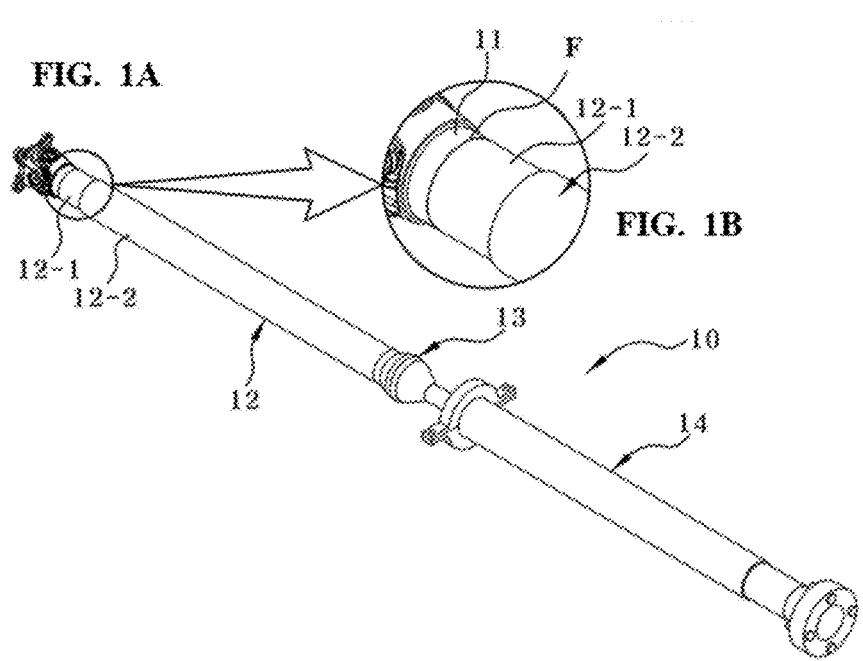
FIG. 1A is a view illustrating a conventional propeller shaft for a vehicle according to the prior art.
FIG. 1B is an expanded view of a circled portion in FIG. 1A.

It should be understood that the appended drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment. In the figures, the reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

Figure 2:
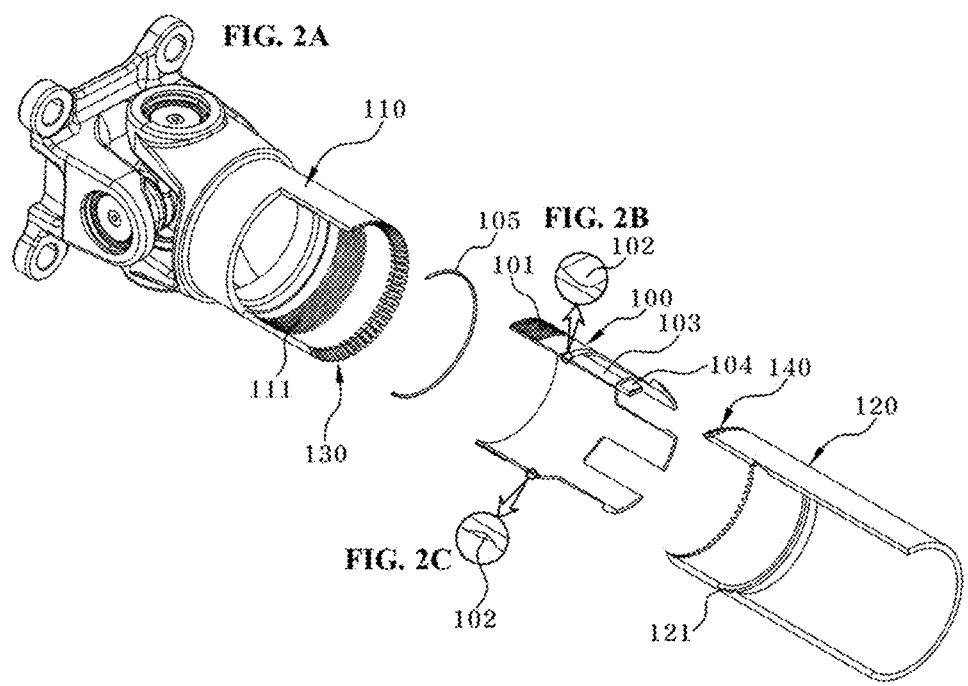
FIG. 2A is an exploded perspective view of a propeller shaft for a vehicle according to an exemplary embodiment of the present disclosure, which is partially illustrated in section.
FIG. 2B is an enlarged view of a first circled portion in FIG. 2A.
FIG. 2C is an enlarged view of a second circled portion in FIG. 2A.
Figure 3:
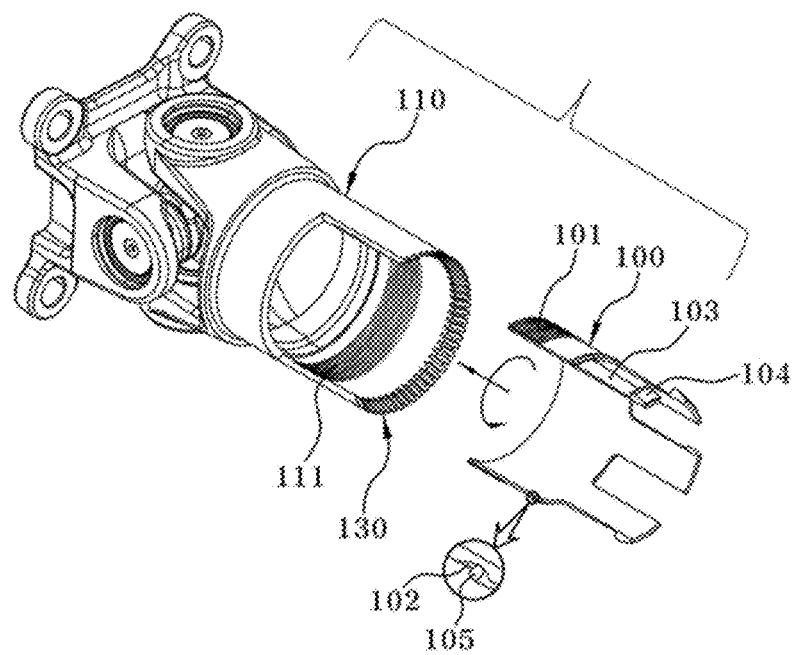
FIGS. 3 to 4 are perspective views illustrating an assembly procedure of the propeller shaft for a vehicle according to the exemplary embodiment of the present disclosure, which are partially illustrated in section.
Figure 4:
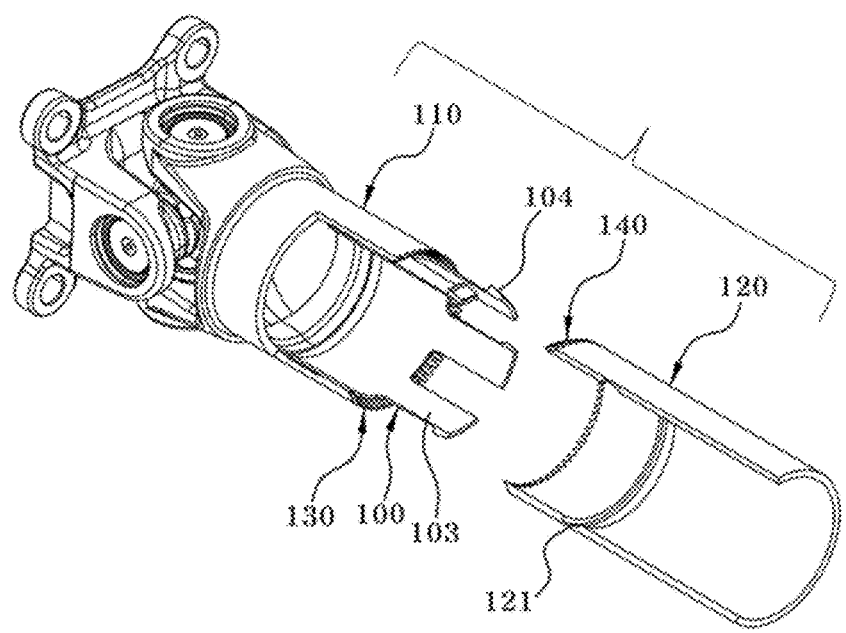
Figure 5:
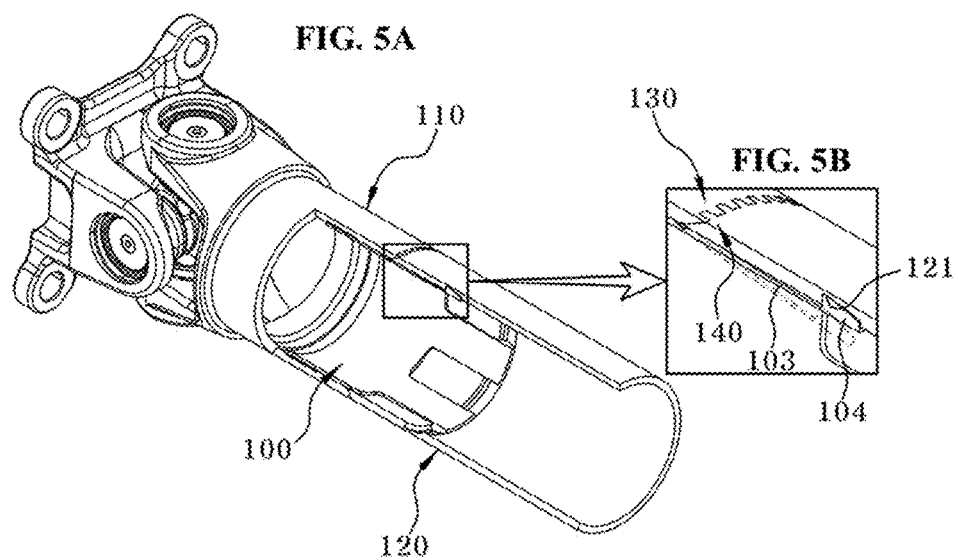
FIG. 5A is a perspective view illustrating an assembly procedure of the propeller shaft for a vehicle according to the exemplary embodiment of the present disclosure, which are partially illustrated in section.
FIG. 5B is an enlarged view of a circled portion in FIG. 5A.

Hereinafter, preferred embodiments of the present disclosure will be described in detail with reference to the accompanying drawings. FIG. 2A is an exploded perspective view of a propeller shaft for a vehicle according to an exemplary embodiment of the present disclosure, which is partially illustrated in section. FIGS. 3, 4, and 5A are perspective views illustrating an assembly procedure of the propeller shaft for a vehicle according to the exemplary embodiment of the present disclosure, which are partially illustrated in section. In the drawings, reference numeral "100" denotes an adapter.

The adapter 100 may connect a tube yoke 110, which is connected to the output side of a transmission, among components of the propeller, to a main tube 120, which extends the input side of a differential gear unit and is oriented in the longitudinal direction of the vehicle. In other words, the adapter 100 may have a cylindrical shape, the front end of which may be coupled to the inner surface of the tube yoke 110 and the rear end of which may be coupled to the inner surface of the main tube 120 to connect the tube yoke 110 to the main tube 120.

Accordingly, the adapter 100 may include at the front end thereof a male threaded portion 101 and at the rear end thereof a plurality of elastic clips 103, a breakage-inducing notch 102 being formed between the front end and the rear end thereof, as illustrated in FIGS. 1A and 1B. More specifically, the male threaded portion 101 may be formed in the outer surface of the front end of the adapter 100, and the plurality of elastic clips 103 may be circumferentially arranged at regular intervals at the rear end of the adapter 10 and project rearwards. The breakage-inducing notch 102 may be formed in the outer surface of the adapter 100 between the front end and the rear end thereof so as to have a "V"-shaped section.

Each of the elastic clips 103 may be integrally provided at the rear end thereof with a hook 104, which is bent outwards for coupling with the main tube 120. In particular, the inner surface of the tube yoke 110 may be formed with a female threaded portion 111, with which the male threaded portion 101 of the adapter 100 may be threadedly engaged, and the inner surface of the main tube 120 may be formed with a locking groove 121, into which the hooks 104 formed on the elastic clips 103 of the adapter 100 may be fitted.

Accordingly, when the male threaded portion 101 of the adapter 100 is threadedly engaged with the female threaded portion of the tube yoke 110 and the main tube 120 is pushed toward the rear end of the adapter 100, as illustrated in FIGS. 3 and 4, the elastic clips 103 may be fitted into the main tube 120 while being bent inwards, and then the hooks 104 of the elastic clips 103 may be moved outwards by virtue of the elastic restoring force and may be locked in the locking groove 121, with the result that the tube yoke 110 is integrally connected to the main tube via the adapter 100, as illustrated in FIGS. 5A and 5B.

Particularly, an O-ring 105 may be fitted into the breakage-inducing notch 102 before the tube yoke 110 is connected to the main tube 120 via the adapter 100, to prevent foreign substances, moisture or the like from entering the tube yoke 100 and the main tube 120. The tube yoke 110 may include at the rear end thereof first tapered splines 130, and the main tube 120 may include at the front end thereof second tapered splines 140, which are alternately engaged with the first tapered splines 130 and are in oblique surface contact with the second tapered splines 140.

The rear surfaces of the first tapered splines 130 and the front surface of the second tapered splines 140 may have respective tapered surfaces and thus, the rear surfaces of the first tapered splines 130 and the front surface of the second tapered splines 140 may be in oblique surface contact with each other. Accordingly, when the first tapered splines 130 of the tube yoke 110 and the second tapered splines 140 of the main tube 120 are displaced relative to each other at the oblique surface contact region due to the impact energy caused by a vehicle collision, the first tapered splines 130 or the second tapered splines 140 strike the breakage-inducing notch 102 of the adapter 100, and breakage occurs at the breakage-inducing notch 102, thereby dividing the adapter 100 into two pieces.

Figure 6:
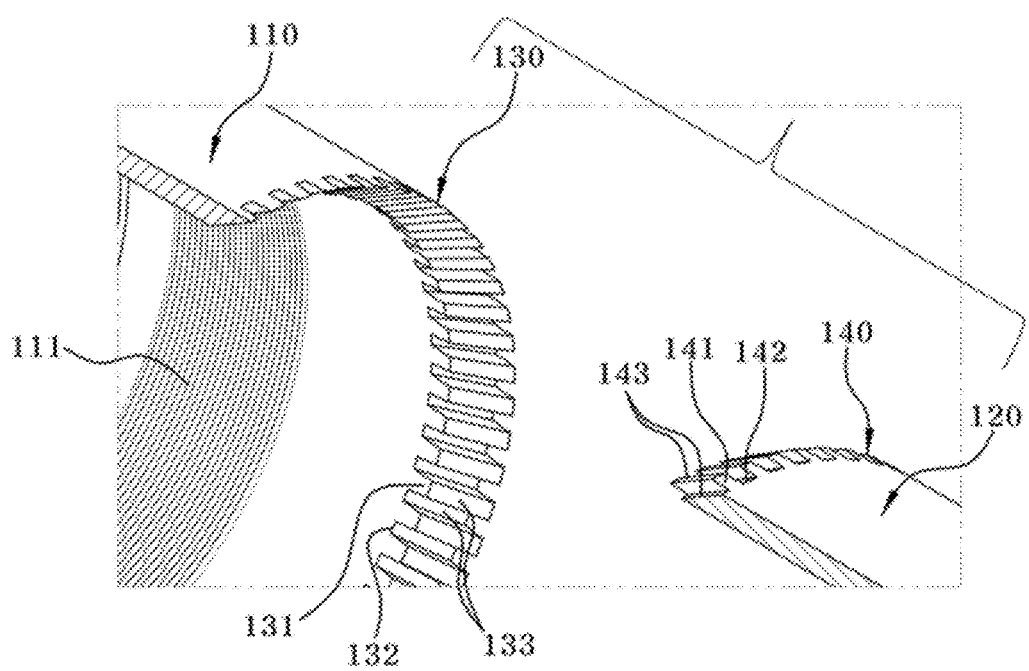
FIGS. 6 to 8 are views illustrating an example of tapered splines formed at the tube yoke and the main tube of the propeller shaft for a vehicle according to the exemplary embodiment of the present disclosure.

In one exemplary embodiment for implementing this, the first tapered splines 130 may include a plurality of first teeth 131 and a plurality of first tooth grooves 132, which are circumferentially and alternately arranged at the rear end of the tube yoke 110, and the rear surface of each of the first teeth 131. The first tooth grooves 132 may have a first tapered surface 133, which is inclined outwards from the inner surface to the outer surface of the tube yoke 110, as illustrated in FIG. 6. Furthermore, the second tapered splines 140 may include a plurality of second teeth 141 and a plurality of tooth grooves 142, which are circumferentially and alternately arranged at the front end of the main tube 120, and the front surface of each of the second teeth 141. The second tooth grooves 142 may have a second tapered surface 143, which is inclined inwards from the outer surface to the inner surface of the main tube 120, as illustrated in FIG. 6.

Figure 7:
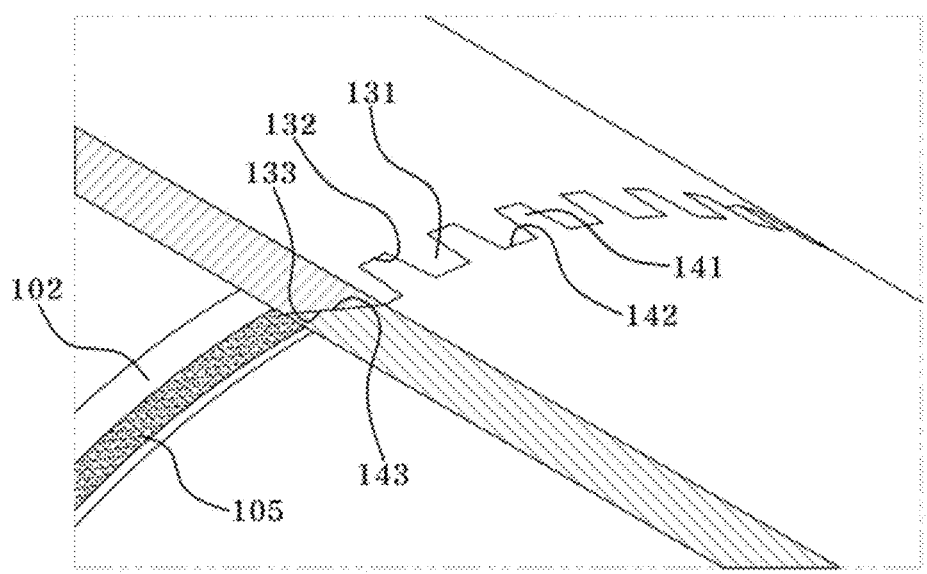

Consequently, when the tube yoke 110 and the main tube 120 are connected to each other by the adapter 100, the first teeth 131 of the first tapered splines 130 may be fitted into the second tooth grooves 142 in the second tapered splines 140 and engaged therewith, and the first teeth 141 of the second tapered splines 140 may be fitted into the first tooth grooves 132 in the first tape splines 130 and engaged therewith, whereby the first tapered surfaces 133 of the first tapered splines 130 are in oblique surface contact with the second tapered surfaces 143 of the second tapered splines 140, as illustrated in FIG. 7. Since the first teeth 131 of the first tooth grooves 132 of the first tapered splines 130 are respectively engaged with the second tooth grooves 142 and the second teeth 141 of the second tapered splines 140, the rotational force output from a transmission may be transmitted to a differential gear unit, which is configured to distribute the rotational force to a rear-wheel drive shaft, via the tube yoke 110 and the main tube 120.

Figure 8:
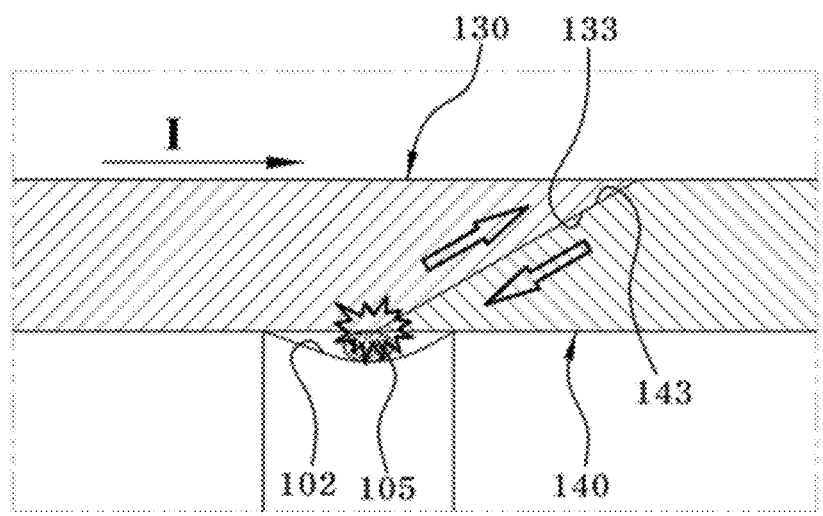

Meanwhile, when the impact energy caused by a vehicle collision is transmitted to the tube yoke 110, since the first tapered surfaces 133 of the first tapered splines 130 are in oblique surface contact with the second tapered surfaces 143 of the second tapered splines 140, the first tapered splines 130 of the tube yoke 110 may be displaced outwards while the second tapered splines 140 of the main tube 120 are displaced inwards, and thus, the first tapered splines 130 are displaced relative to the second tapered splines 140, as indicated by the arrows in FIG. 8. The reference number I in FIG. 8 indicates an impact direction in event of a collision. At the same time, the second tapered splines 140 may strike and push the breakage-inducing notch 102 of the adapter 100 while being displaced inwards, and thus breakage occurs at the breakage-inducing notch 102, and thus, the front part and the rear part of the adapter 100 may be separated from each other.

Particularly, since the adapter 100, which connects the tube yoke 110 to the main tube 120, is divided into the front part and the rear part, the tube yoke 110, which is threadedly coupled to the front end of the adapter 100, and the main tube 120, which is connected to the rear end of the adapter 100 by the elastic clips 103, may be separated from each other. Additionally since the front part and the rear part of the adapter 100 are separated from each other and thus the tube yoke 110 and the main tube 120 are also separated from each other by the impact energy caused by a vehicle collision, it may be possible to efficiently absorb the impact energy caused by the vehicle collision.

Even when the impact energy caused by the vehicle collision is not correctly transmitted in the longitudinal direction of the propeller shaft, the first tapered splines 130 and the second tapered splines 140 may strike and break the notch 102 in the adapter 100 while being displaced relative to each other, and the tube yoke 110 and the main tube 120 may thus be reliably separated from each other to absorb the impact energy caused by the vehicle collision. Additionally, even when the first tapered surfaces 133 of the first tapered splines 130 and the second tapered surfaces 143 of the second tapered splines 140 are formed in a reverse manner, it may be possible to realize an effect of absorbing the impact energy.

Figure 9:
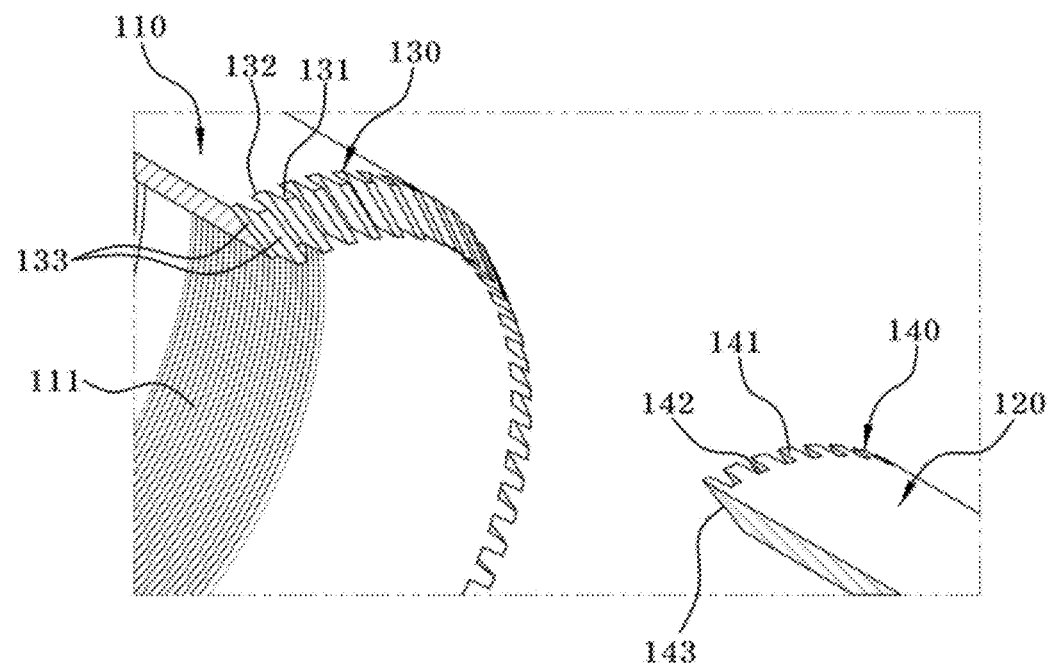
FIGS. 9 to 11 are views illustrating another example of tapered splines formed at the tube yoke and the main tube of the propeller shaft for a vehicle according to the exemplary embodiment of the present disclosure.
Figure 10:
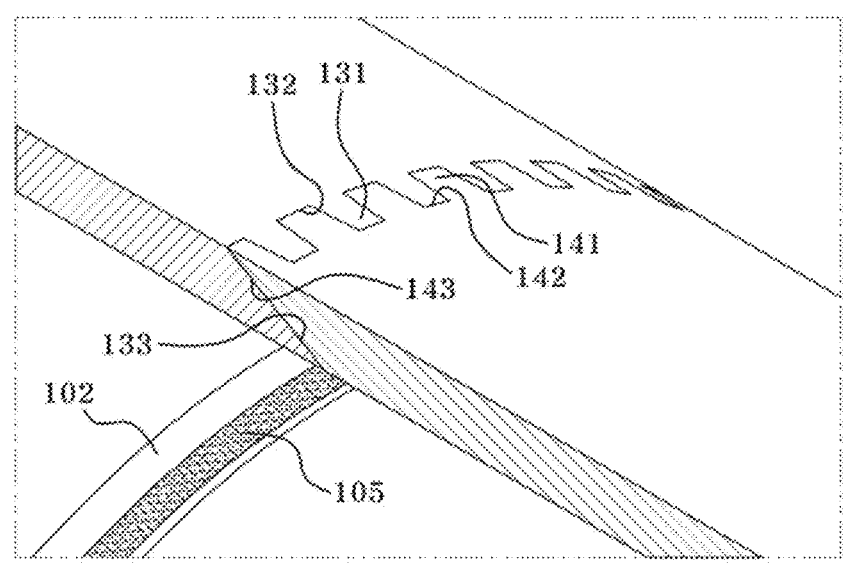

In another exemplary embodiment for implementing the same, the first tapered splines 130 may include a plurality of first teeth 131 and a plurality of first tooth grooves 132, which are circumferentially and alternately arranged at the rear end of the tube yoke 110, and the rear surface of each of the first teeth 131. The first tooth grooves 132 may be formed into a first tapered surface 133, which is inclined inwards from the outer surface to the inner surface of the tube yoke 110, as illustrated in FIGS. 9 and 10.

Furthermore, the second tapered splines 140 may include a plurality of second teeth 141 and a plurality of second tooth grooves 142, which are circumferentially and alternately arranged at the front end of the main tube 120, and the front surface of each of the second teeth 141. The second tooth grooves 142 may be formed into a second tapered surface 143, which is inclined outwards from the inner surface to the outer surface of the main tube 120, as illustrated in FIGS. 9 and 10.

Figure 11:
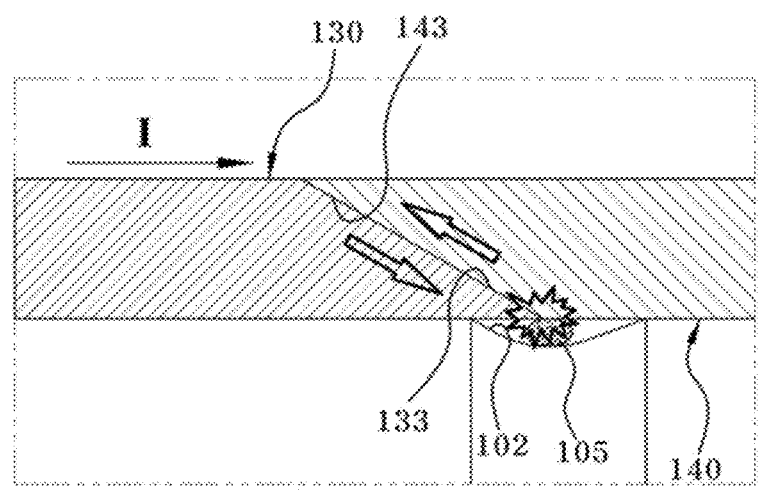

Accordingly, when the impact energy caused by the vehicle collision is transmitted to the tube yoke 110, since the first tapered surfaces 133 of the first tapered splines 130 are in oblique surface contact with the second tapered surfaces 143 of the second tapered splines 140, the first tapered splines 130 of the tube yoke 110 may be displaced inwards while the second tapered splines 140 of the main tube 120 are displaced outwards, thus displacing the first tapered splines 130 relative to the second tapered splines 140, as indicated by the arrows in FIG. 11. At the same time, the first tapered splines 130 may strike and push the breakage-inducing notch 102 of the adapter 100 while being displaced inwards, and thus breakage occurs at the breakage-inducing notch 102, thereby separating the front part and the rear part of the adapter 100 from each other. In particular, the tube yoke 110, which is threadedly coupled to the front end of the adapter 100, and the main tube 120, which is connected to the rear end of the adapter 100 by means of the elastic clips 103, may also be separated from each other. The reference number I in FIG. 11 indicates an impact direction in event of a collision.

As described above, even when the first tapered surfaces 133 of the first tapered splines 130 and the second tapered surfaces 143 of the second tapered splines 140 are formed in a reverse manner, the front part and the rear part of the adapter 100 may be separated from each other and the tube yoke 110 and the main tube 120 may also be separated from each other by the impact energy caused by the vehicle collision, thereby making it possible to efficiently absorb the impact energy caused by the vehicle collision.

By virtue of the above-described constructions, the present disclosure offers the following effects.

First, since the tapered splines are formed at the contact portions between the tube yoke and the main tube, it may be possible to transmit the power output from a transmission to a rear wheel. Furthermore, since the tube yoke and the main tube may be displaced relative to each other to cause breakage at the notch in the adapter by the impact energy caused by a vehicle collision, the tube yoke and the main tube may be separated from each other by virtue of the breakage of the adapter, thereby efficiently absorbing the impact energy.

Second, even when the impact energy caused by a vehicle collision is incorrectly transmitted in the longitudinal direction of the propeller shaft, that is, regardless of the direction in which the impact energy is transmitted, the tube yoke and the main tube may be displaced relative to each other at the tapered splines to strike and break the notch in the adapter, and thus, the tube yoke and the main tube may be reliably separated from each other to absorb the impact energy caused by the vehicle collision.

Third, it may be possible to assemble the tube yoke with the main tube more easily using the adapter including a threaded portion and clips.

Fourth, since the O-ring is fitted into the notch in the adapter, it may be possible to prevent foreign substances from entering the propeller shaft and thus to ensure a watertight structure at normal times.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A propeller shaft for a vehicle, comprising:
an adapter, coupled at a front end thereof to an inner surface of a tube yoke and coupled at a rear end thereof to an inner surface of a main tube and which has a breakage-inducing notch formed at a predetermined location between the front end and the rear end of the adapter;
first tapered splines formed at a rear end of the tube yoke; and
second tapered splines formed at a front end of the main tube and alternately engaged with the first tapered splines to transmit power,
wherein breakage occurs at the breakage-inducing notch due to a striking force generated when the first tapered splines of the tube yoke are displaced relative to the second tapered splines of the main tube by impact energy caused by a vehicle collision,
wherein the first tapered splines have decreasing thicknesses toward the rear end of the tube yoke and the second tapered splines have decreasing thicknesses toward the front end of the main tube, wherein the first tapered splines and the second tapered splines are configured to mate with each other.

2. The propeller shaft of claim 1, wherein the inner surface of the tube yoke includes a female threaded portion, and the front end of the adapter includes a male threaded portion to be threadedly engaged with the female threaded portion of the tube yoke.

3. The propeller shaft of claim 1, wherein the inner surface of the main tube includes a locking groove, and the rear end of the adapter includes a plurality of elastic clips to be coupled to the locking groove.

4. The propeller shaft of claim 3, wherein each of rear ends of the plurality of elastic clips is integrally formed with a hook, which is bent outwards to be fitted into the locking groove.

5. The propeller shaft of claim 1, further comprising:
an O-ring fitted into the breakage-inducing notch in the adapter to block infiltration of foreign substances.

6. The propeller shaft of claim 1, wherein rear surfaces of the first tapered splines and front surfaces of the second tapered splines have tapered surfaces, which are in oblique surface contact with each other.

7. The propeller shaft of claim 6, wherein the first tapered splines include a plurality of first teeth and a plurality of first tooth grooves, which are circumferentially and alternately arranged, and a rear surface of each of the plurality of first teeth and the plurality of first tooth grooves is formed into a first tapered surface, which is inclined outwards from the inner surface to an outer surface of the tube yoke.

8. The propeller shaft of claim 6, wherein the second tapered splines include a plurality of second teeth and a plurality of second tooth grooves, which are circumferentially and alternately arranged, and a front surface of each of the plurality of second teeth and the plurality of second tooth grooves is formed into a second tapered surface, which is inclined inwards from an outer surface to the inner surface of the main tube.

9. The propeller shaft of claim 6, wherein the first tapered splines include a plurality of first teeth and a plurality of first tooth grooves, which are circumferentially and alternately arranged, and a rear surface of each of the plurality of first teeth and the plurality of first tooth grooves is formed into a first tapered surface, which is inclined inwards from an outer surface to the inner surface of the tube yoke.

10. The propeller shaft of claim 6, wherein the second tapered splines include a plurality of second teeth and a plurality of second tooth grooves, which are circumferentially and alternately arranged, and a front surface of each of the plurality of second teeth and the plurality of second tooth grooves is formed into a second tapered surface, which is inclined outwards from the inner surface to the outer surface of the main tube.

11. A propeller shaft for a vehicle, comprising:
an adapter, coupled at a front end thereof to an inner surface of a tube yoke and coupled at a rear end thereof to an inner surface of a main tube and which has a breakage-inducing notch formed at a predetermined location between the front end and the rear end of the adapter;
first tapered splines formed at a rear end of the tube yoke; and
second tapered splines formed at a front end of the main tube and alternately engaged with the first tapered splines to transmit power,
wherein breakage occurs at the breakage-inducing notch due to a striking force generated when the first tapered splines of the tube yoke are displaced relative to the second tapered splines of the main tube by impact energy caused by a vehicle collision,
wherein the inner surface of the main tube includes a locking groove, and the rear end of the adapter includes a plurality of elastic clips to be coupled to the locking groove.

12. The propeller shaft of claim 11, wherein each of rear ends of the plurality of elastic clips is integrally formed with a hook, which is bent outwards to be fitted into the locking groove.

13. A propeller shaft for a vehicle, comprising:
an adapter, coupled at a front end thereof to an inner surface of a tube yoke and coupled at a rear end thereof to an inner surface of a main tube and which has a breakage-inducing notch formed at a predetermined location between the front end and the rear end of the adapter;
first tapered splines formed at a rear end of the tube yoke;
second tapered splines formed at a front end of the main tube and alternately engaged with the first tapered splines to transmit power; and
an O-ring fitted into the breakage-inducing notch in the adapter to block infiltration of foreign substances,
wherein breakage occurs at the breakage-inducing notch due to a striking force generated when the first tapered splines of the tube yoke are displaced relative to the second tapered splines of the main tube by impact energy caused by a vehicle collision.

* * * * *